Dec. 20, 1927.
O. S. HERSHEY
AUTOMOBILE LOCK
Original Filed Nov. 24, 1926
1,653,567
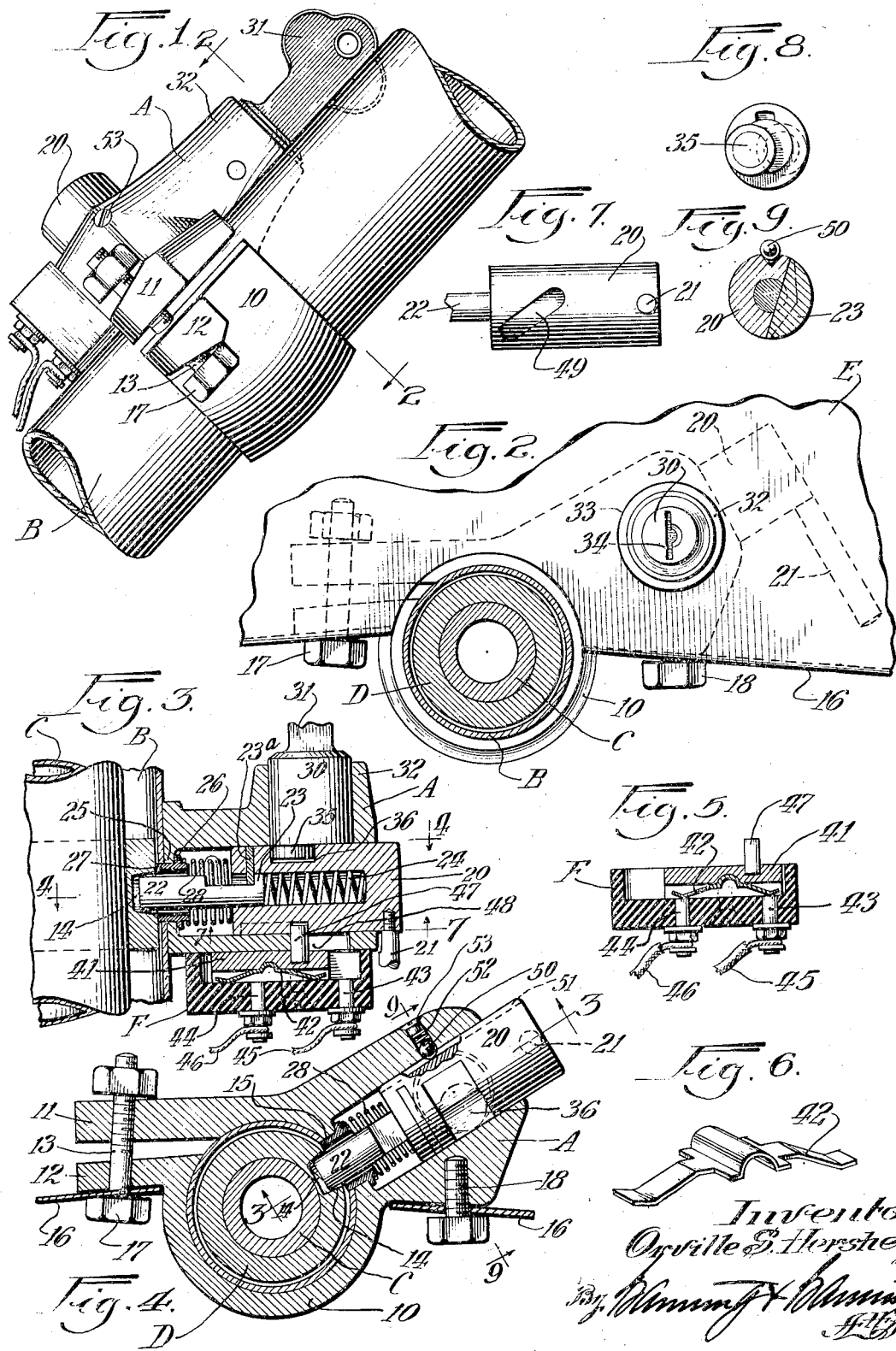

Patented Dec. 20, 1927.

1,653,567

UNITED STATES PATENT OFFICE.

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO.

AUTOMOBILE LOCK.

Application filed November 24, 1926, Serial No. 150,403. Renewed October 12, 1927.

This invention relates to a lock adapted especially for automobiles, and is designed particularly for association with one of the operating units thereof. It may be connected with a steering mechanism, a change speed mechanism, a motor ignition circuit, or any other unit or system whose operation is required in the use of a vehicle.

The embodiment of my invention herein shown and described includes a switch which may be interposed in the motor ignition circuit. Such a switch is designed to be opened, thereby rendering the motor inoperative, whenever the lock is operated to interfere with use of an associated mechanism.

The present invention embodies certain improved features in the connection between the lock and switch, by which the switch may be opened without actuation of the lock, whereby the motor may be disabled; it also provides for a coincidental operation, in which both the lock and switch are affected simultaneously, or nearly so. This actuation of either the switch or lock, or both, is effected through a single means having an optional dual movement.

As a further object of this invention, the lock housing is designed for attachment to the dash or instrument board so as to constitute a supporting medium for the steering column. The major portion of the lock housing is positioned to the rear of the dash or instrument board so as to be concealed thereby. The lock control means may be extended through the board for convenient manipulation from the forward side thereof. Also a second control means for the switch only is disposed upon the rear side of the dash or instrument board in a relatively inconvenient position for operation. This switch control is intended only for occasional use, and its location in a relatively inaccessible place is designed to encourage the use of the coincidental lock control which is so placed as to be convenient for operation at all times.

Objects such as these, as well as others which will hereinafter appear, are set forth, in the accompanying drawing wherein I have illustrated a preferred construction in the manner following:

Figure 1 is a side elevation of the lock housing mounted operatively on a steering column;

Fig. 2 which is a transverse section through the steering column about on line 2—2 of Fig. 1 shows in elevation a portion of the dash or instrument board with which the lock structure is connected;

Fig. 3 is a longitudinal section taken on line 3—3 of Fig. 4, and shows the lock and switch in advanced and open positions, respectively;

Fig. 4 is a longitudinal section taken on line 4—4 of Fig. 3;

Fig. 5 is a sectional detail which shows the switch of Fig. 3 in closed position;

Fig. 6 is a perspective view of the spring brush forming part of the switch;

Fig. 7 is a view in elevation of the plunger associated with the locking bolt;

Fig. 8 is a view in elevation of the rear or inner end of the lock cylinder; and Fig. 9 is a transverse section through the plunger taken on line 9—9 of Fig. 4.

The present lock may be contained within a housing A which, in the form shown, is provided with a split collar 10 adapted to surround a steering column B. Extending within the column is the usual post C connecting the steering wheel with the swiveled running wheels at the front of the automobile. The collar may be formed with two lateral lugs 11 and 12 slightly spaced and adapted to be drawn toward each other as by means of a bolt 13. By this means the collar may be clamped tightly upon the column in fixed relation thereto. Secured fast to the post C is a collar D wherein is a groove or socket 14 which may be brought into register with an opening 15 formed in the column.

In the construction shown, the two collar lugs are located to the same side of the axis of the column as is the main portion of the lock housing. This renders it possible to position the entire lock structure to the rear of a dash or instrument board E whose lower edge is inturned to provide a flange 16 interrupted at one point for the protrusion therethrough of a portion of the collar 10. The remaining portions of the lock structure are disposed over the flange 16 and to the rear side of the dash board E, as indicated best in Fig. 2. In this position the lock structure may be secured by the bolt 13 whose head 17 bears against the under side of the board flange, and also, if desired, by a second bolt 18 whose head is similarly disposed. The lock housing, together with the associated collar 10 and lugs 11 and 12, when so connected to the instrument board furnishes a strong and fixed support for the steering column.

Within the housing is a cylindrical aperture wherein is movably mounted a hollow plunger 20 equipped at its outer end with a laterally extending rod 21 forming an operating lever therefor. Within the plunger is slidably received a locking bolt 22 flattened on one side to provide a recess having at one end a stop shoulder with which may engage a plate 23ª carried by the plunger. By this means I limit the movement of the bolt outwardly from the plunger. A compression spring 24 within the plunger bears with pressure against the bolt so as to normally project the same to a locking position, as shown. The inner end of the aperture wherein the plunger 20 is received is provided with a shoulder 25 against which bears a flange 26 extending from a bushing 27 which is fitted within the opening 15 in the column. This bushing tends both to center the housing aperture relative to the column opening, and to provide a guiding support for the locking bolt. The bushing is held in place as by means of a coiled spring 28 which is interposed between its outer end and the inner end of the plunger, the spring serving also to return the plunger to an outer position, as indicated by the dotted lines in Fig. 2.

The movements of the plunger may be controlled by means of a lock cylinder 30 operable with a key 31 which is specially designed therefor. This cylinder, which is disposed with its axis transverse to that of the plunger, is encased within a boss 32 extending laterally upon the front side of the lock housing. As shown in Fig. 2, an opening 33 is provided in the dash or instrument board E for the protrusion therethrough of the boss whereby the cylinder slot 34 is presented conveniently for insertion of the key 31. Upon the rear or inner end of the lock cylinder 30 is an eccentric 35 slidably disposed within a cross slot 36 in the plunger, whereby to impart longitudinal movements thereto when the lock cylinder is rotated. It is contemplated that the key 31 shall be removable from the lock cylinder only in either of its extreme positions which, as shown, are 180° apart.

Connected removably to the lock cylinder is a second housing F of insulating material wherein is a longitudinal chamber for the reception of a slide block 41. Carried by this block is a brush 42 in the form of a spring leaf having a fixed mounting in the block. The two ends of this brush are adapted to make contact with the inner ends of two posts 43 and 44 which are extended through the switch housing to connect at their outer ends with electrical conductors 45 and 46 respectively. It is contemplated that these conductors shall form part of an electrical circuit which is broken when the block 41 is shifted endwise to the position of Fig. 3. With the block moved back to the position of Fig. 5, the circuit is reestablished.

To effect movements of the switch block, I extend therefrom a pin 47 which passes through a slot 48 in the lock housing to engage with a cam which, as shown, consists of an oblique slot 49 formed in the surface of the plunger 20. The movements communicated to the plunger by rotation of the lock cylinder are normally without rotation due to the provision of a detent which may take the form of a ball 50 which extends into a shallow groove 51 formed longitudinally of the plunger; the ball being held with pressure in this position as by a spring 52 which is confined in place with the aid of a set screw 53. So long as the ball 50 remains in the groove 51 to hold the plunger against rotation, the pin 47 will remain at the outer end of the slot 49 to receive from its walls an endwise directed force which reciprocates the block in unison with the plunger. By this means I have provided for the switch being opened whenever the locking bolt 21 is moved to an inner position where operation of the steering mechanism is disabled. Likewise, when the locking bolt is retracted to free the steering mechanism, the switch is also shifted to its closed position so as to reestablish the electrical circuit. Both of these movements are under the control of the key 31 which is operable from the front side of the dash or instrument board.

In the event that it is desired to operate only the switch the lever control 21 may be manipulated for this purpose. This is located, practically, if not entirely, out of sight, but nevertheless in a position where it can be reached from the normal position of the car operator. If this lever be rocked, the plunger 20 will oscillate to force a travel of the pin 47 from the rear end of the slot 49, thereby shifting the block 41 to an inner position, as shown in Fig. 3. In accomplishing this movement the detent 50 is first required to yield. A reverse movement of the lever 21 will have the opposite effect, namely, the block 41 will be shifted back to the circuit closing position of Fig. 5 where the detent 50 reengages within the groove 51. The present lock mechanism is thus provided with an auxiliary or independent control which affects the switch only. In the event that the plunger 20 is first oscillated to a position which opens the switch and the key 31 be then operated to advance the locking bolt, the plunger in its consequent movement will oscillate until the detent 50 is reengaged in the groove 51.

The coincidental lock construction of my invention is designed with a view to simplicity and economy in the production and assembly of its parts. It combines the desirable features of a lock and switch which are operable concurrently with the aid of a removable key, and also an auxiliary or independent control, placed out of sight, for operation of the switch only.

I claim:

1. In combination with a dash board having a flanged lower edge, a lock structure arranged adjacent the rear side of the board and the flanged edge thereof, and having actuating means exposed through the board, and a connection between the lock structure and the board extending through the flanged edge of the latter, substantially as described.

2. In combination with a dash board having its lower edge inturned to provide a flange, there being also a cut extending into the board from the lower edge thereof, a lock structure having a portion of itself surrounding a steering column and extended through the cut in the board, the remaining portion of the lock structure lying to the rear of the board for concealment thereby, and means connecting the lock structure with the board extending through the flange of the latter to provide a support for the steering column adjacent the board, substantially as described.

3. In combination with a dash board having its lower edge inturned to provide a flange, there being a cut in the lower portion of the board extending inwardly from its flanged edge and an opening through the board spaced therefrom, and a lock structure positioned rearwardly of the board having a portion of itself exposed through the opening therein and another portion projecting through the cut adjacent the lower edge thereof to connect with a steering column, the remainder of the lock structure being concealed behind the board, and means connecting the structure to the board in a manner whereby the former may serve as a support for a steering column, substantially as described.

4. In combination with a flanged dash board, a lock structure having a collar adapted to surround a steering column and a pair of spaced lugs extended laterally from the collar behind the board one adjacent the flange thereof, and a bolt passing through both lugs and the flange adapted to clamp the collar about the steering column and connecting the lock structure to the board, substantially as described.

5. In combination with a dash board having a cut adjacent its lower edge and remote therefrom an opening through the board, a lock structure connected to the board upon the rear side thereof having a control means which is extended through the opening in the board for manipulation upon the front side thereof, and a second control means independent of the first operable from behind the board, substantially as described.

6. A coincidental lock having a housing with a collar adapted to surround a steering column, the collar having a lug which cooperates with a part of the housing to furnish a bearing, a dash board arranged in front of the housing with a portion of its collar depending therebelow, there being means on the board with which the bearing cooperates, means connecting the housing fixedly to the board, a lock control extended through the dash board for manipulation upon the front ends thereof, and a second independent lock control disposed rearwardly of the board, substantially as described.

7. A coincidental lock having in combination a two position bolt in association with a two position switch which is interposed in an electrical circuit, and dual control means associated with the bolt, one adapted to operate both the bolt and switch together, and the other to operate the switch alone, substantially as described.

8. A coincidental lock having in combination a two position bolt in association with a two position switch which is interposed in an electrical circuit, a single means for moving the bolt to and from effective position and for concurrently shifting the switch to "on" and "off" positions, and other means operating independently of the bolt for shifting the switch to "on" or "off" positions, substantially as described.

9. A coincidental lock in which is combined a hollow plunger mounted for reciprocation or oscillation, a locking bolt associated with the plunger and adapted to be reciprocated with longitudinal movements thereof, a two position switch, means extending from the switch for engagement within an oblique slot in the plunger and adapted to transmit motion to the former with reciprocations or oscillations of the latter, and control means associated with the plunger for imparting either of two movements thereto, substantially as described.

10. A coincidental lock having a plunger mounted for reciprocation or oscillation, yielding means by which the plunger is prevented from oscillating while reciprocating, a locking bolt connected with the plunger and adapted to be reciprocated in response to like movements thereof, a switch also associated with the plunger, means connecting the switch for movement with the plunger when the latter is moved in any direction, and control means for imparting a desired movement to the plunger, substantially as described.

11. In combination with a dash board having an opening therethrough, a lock structure positioned upon the rear side of the board and having a control means which is opposite the opening therein for manipulation upon the front side thereof, and a second control means independent of the first operable from behind the board, substantially as described.

ORVILLE S. HERSHEY.